United States Patent [19]

Kim

[11] 4,166,302
[45] Sep. 4, 1979

[54] AUTOMATIC VEHICLE DRYING APPARATUS

[76] Inventor: Hyun J. Kim, 4410 St. Barnabas Rd., Marlo Heights, Md. 20031

[21] Appl. No.: 938,339

[22] Filed: Aug. 31, 1978

[51] Int. Cl.² ............................................... B60S 3/06
[52] U.S. Cl. ................................. 15/97 B; 15/DIG. 2
[58] Field of Search ................. 15/DIG. 2, 97 B, 97 R

[56] References Cited
U.S. PATENT DOCUMENTS

| | | | |
|---|---|---|---|
| 3,504,394 | 4/1970 | Weigele et al. | 15/97 B |
| 3,914,818 | 10/1975 | Fromme | 15/97 B |
| 3,940,821 | 3/1976 | Moran | 15/97 B |

Primary Examiner—Edward L. Roberts

[57] ABSTRACT

An automatic vehicle drying apparatus for use in an automatic car wash system comprising a series of vertically hanging towels connected to a rotating carriage and vaccum drying means disposed in the circuit of moving towels for drying the towels as they are rotated across the vehicle, wherein the towels are detachably connected to corresponding transparent flexible support strip elements to permit visual observation of vehicles behind the hanging strips.

8 Claims, 6 Drawing Figures

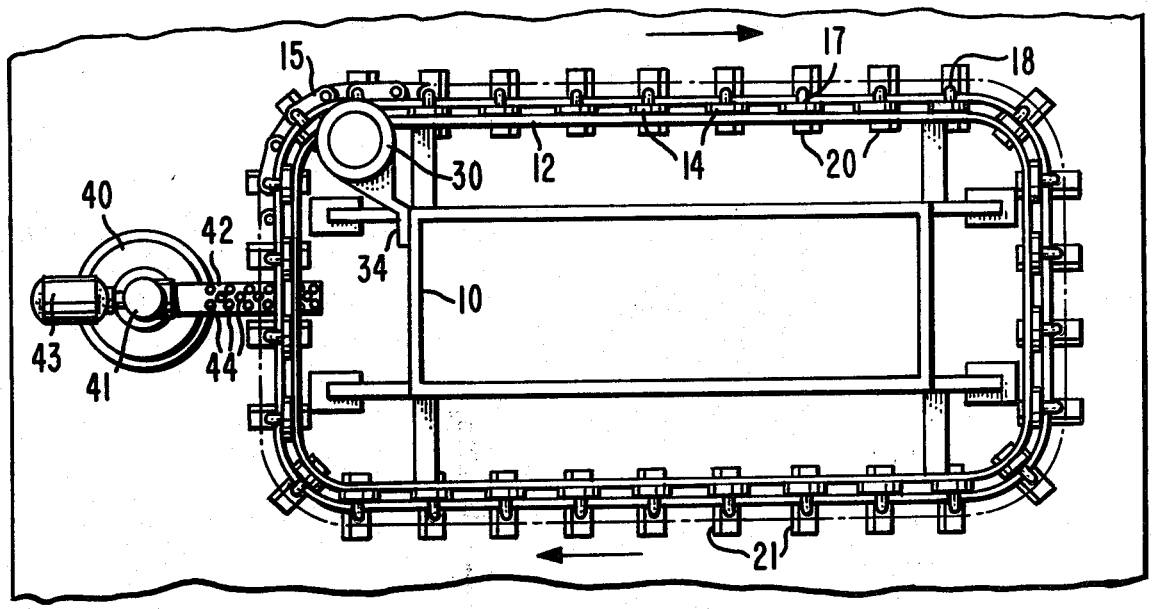
FIG. 2
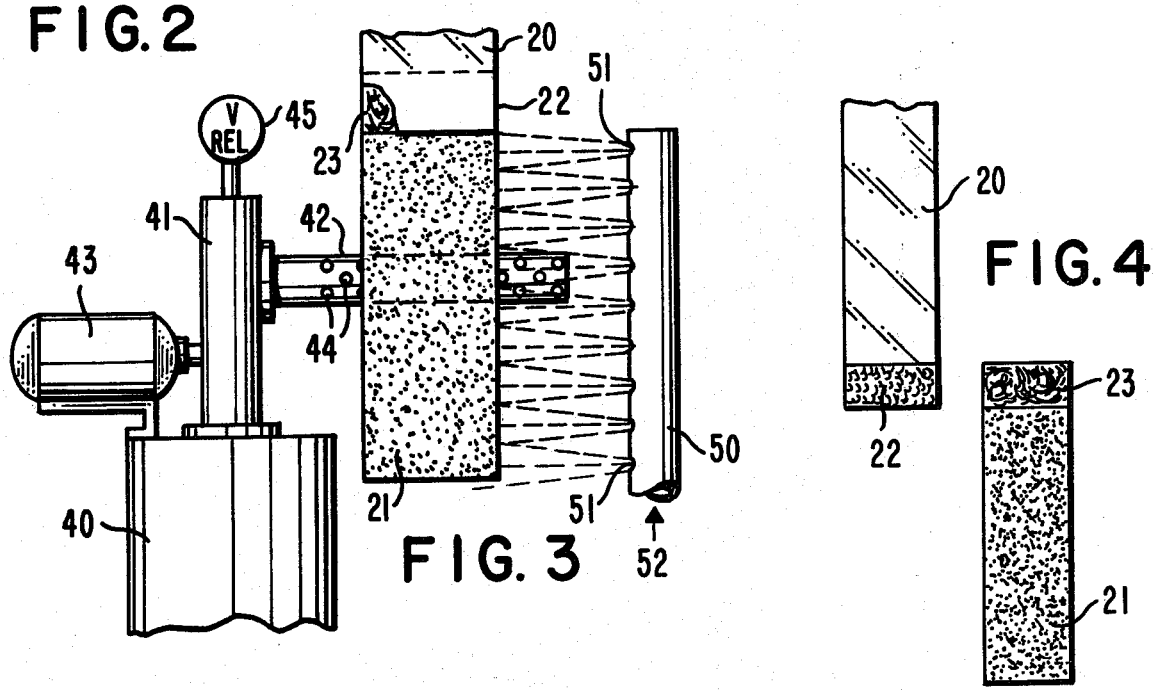
FIG. 3
FIG. 4
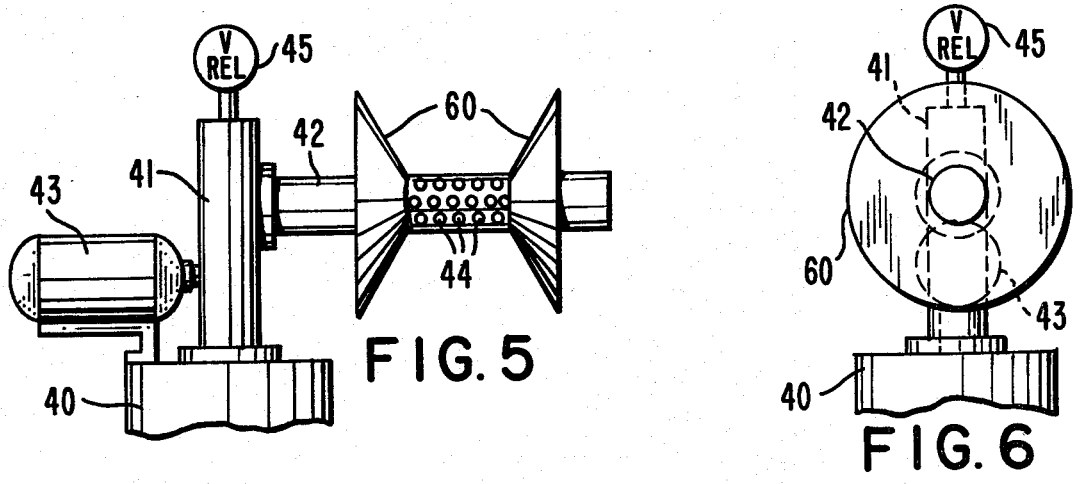
FIG. 5
FIG. 6

AUTOMATIC VEHICLE DRYING APPARATUS

BACKGROUND OF THE INVENTION

This invention relates to automatic car wash systems, and particularly to the drying sub-system thereof.

The art disclosed herein is concerned with the type of drying mechanism employing a series of vertically hanging strips of flexible and absorbent material through which motor vehicles pass along a predetermined path thereby having excess water removed from the surface thereof after having been washed and rinsed, and occasionally, blown dried. These sub-systems have been employed primarily for the purpose of eliminating or reducing required manpower to physically hand dry the vehicle.

In most automatic automobile washing facilities presently in commercial operation, a conveyor mechanism advances the vehicle through a tunnel-like facility in which successively located devices actuated by the vehicle cause it first to be wetted down, then scrubbed with a detergent solution, thereafter rinsed, and finally dried. Drying is most commonly accomplished by a series of blowers. The blowers supply relatively high pressure air to a group of nozzles located in an archlike arrangement about the vehicle throughway. The air from the nozzles blows away most of the rinse water and accelerates evaporation of smaller droplets. However the system is inefficient for two main reasons. Firstly, enough water is left on the vehicle to require the services of one or more workers stationed at the facility exit in order to perform a final dry wiping with a cloth so as to avoid leaving water stains or residue marks on the vehicle surfaces, especially around bumpers and windows. Secondly, the blowers require large motors to operate them, typically at least 40 horsepower, thereby consuming great amounts of electrical energy. The magnitude of energy consumption is particularly evident when it is realized that the blowers operate in excess of a full minute for each automobile that passes through. Further, these blowers produce a high noise level which precludes individuals from working in close proximity to them for extended periods of time. This healthsafety prohibition is specifically defined by the requirements of OSHA, Occupational Safety and Health Administration.

Other prior art automatic drying devices for removing rinse water from vehicles include those which mechanically sweep or draw absorbent materials across the wet surfaces such as in U.S. Pat. No. 3,638,441. That type of apparatus, in its prior forms, however, has not always been as effective in removing water and is subject to accumulations of dirt and grime in the absorbent materials requiring their frequent removal, laundering and replacement. Usually, mechanical wiping systems of that type and air blowers are used in combination because neither acting along is sufficiently effectively.

Reference is also made to U.S. Pat. No. 3,914,818 wherein towel cleaning and dewatering means are incorporated in such a sub-system to eliminate some of the aforementioned draw backs. Towel cleaning is accomplished by water spray nozzles that wet the towels immediately before the pass through rollers which presses excess water from the towels. The obvious disadvantages of this system is cost, maintenance, and danger of injury to workers in close proximity to the rollers.

Furthermore, prior art systems do not employ transparent strips of material to support the hanging towels. Consequently, vehicle cannot be seen by an operator behind the hanging strips. Visual observation may be helpful, and sometimes necessary, during an impending emergency situation or to raise or lower system elements according to the style or condition of the vehicle, such as hood ornaments, rotating beacons on police cars, or taxi cab signs.

In view of the foregoing, the specific objective of this invention is to provide a safe and econimical automatic drying sub-system without the above mentioned disadvantages.

It is another object of this invention to provide means to visually observe the vehicle from each side of the vehicle drying sub-system, employing vertically hanging towels.

It is a further and important object of the invention to provide a towel rinse and drying means where drying is accomplished by a vaccum suction which sucks excess water from the towels.

These and other objects and advantages will become more evident upon reference to the accompanying drawings and specification relating to the invention.

SUMMARY OF THE PRESENT INVENTION

The preferred embodiment of the present invention comprises a rotating carriage, a series of hanging towels attached to corresponding flexible transparent strips which are in turn connected to the rotating carriage, and vaccum drying means disposed in the path of the path of the hanging towels as they are rotated along the carriage guide means. The aforementioned system may also include towel rinsing means to rinse and wash dirt and grime from the towels immediately prior to suction drying. Guide means may also be disposed on the suction element of the vaccum drying means to more effectively position the towels during suction drying. The hanging towels are detachably connected to the transparent support strips so that should any one of the hanging towels become snagged on the vehicle, it becomes disengaged, and thus avoid damage to vehicle or obstruction of the drying mechanism The essential elements of the drying mechanism are a transparent curtain formed by a series of transparent flexible strip elements, detachably mounted towels on the ends thereby vaccum or suction drying means, a towel guide element therefore, towel rinse and wash means, and a carriage means for rotating the towels and curtain across the path of vehicles.

The invention may be altered or modified by the various combinations of these essential elements, with each combination containing at least the vacuum drying means or the transparent curtain element, and still remain with the inventive scope of the disclosure.

Accordingly, each embodiment which may be conceived of subject invention may be expressed in terms of the foregoing essential elements, and it is not the intent of the inventor to limit the scope of the claimed subject matter to the preferred embodiment. All combinations of the foregoing elements, but not inclusive, are intended to comprise the invention.

BRIEF DESCRIPTION OF THE DRAWINGS

Reference to the accompanying drawings will show that:

FIG. 2. is a top view of the vehicle drying sub-system.

FIG. 3. discloses a close up view of the suction drying assembly with one overlapping towel.

FIG. 4. shows a spaced apart view of a detachably mounted towel suction and a transparent flexible hanging strip.

FIG. 5. shows a front view of the suction drying mechanism having towel guide means.

FIG. 6. shows a side view of the suction drying mechanism having towel guide means.

BRIEF DESCRIPTION OF THE INVENTION

Figure 1:
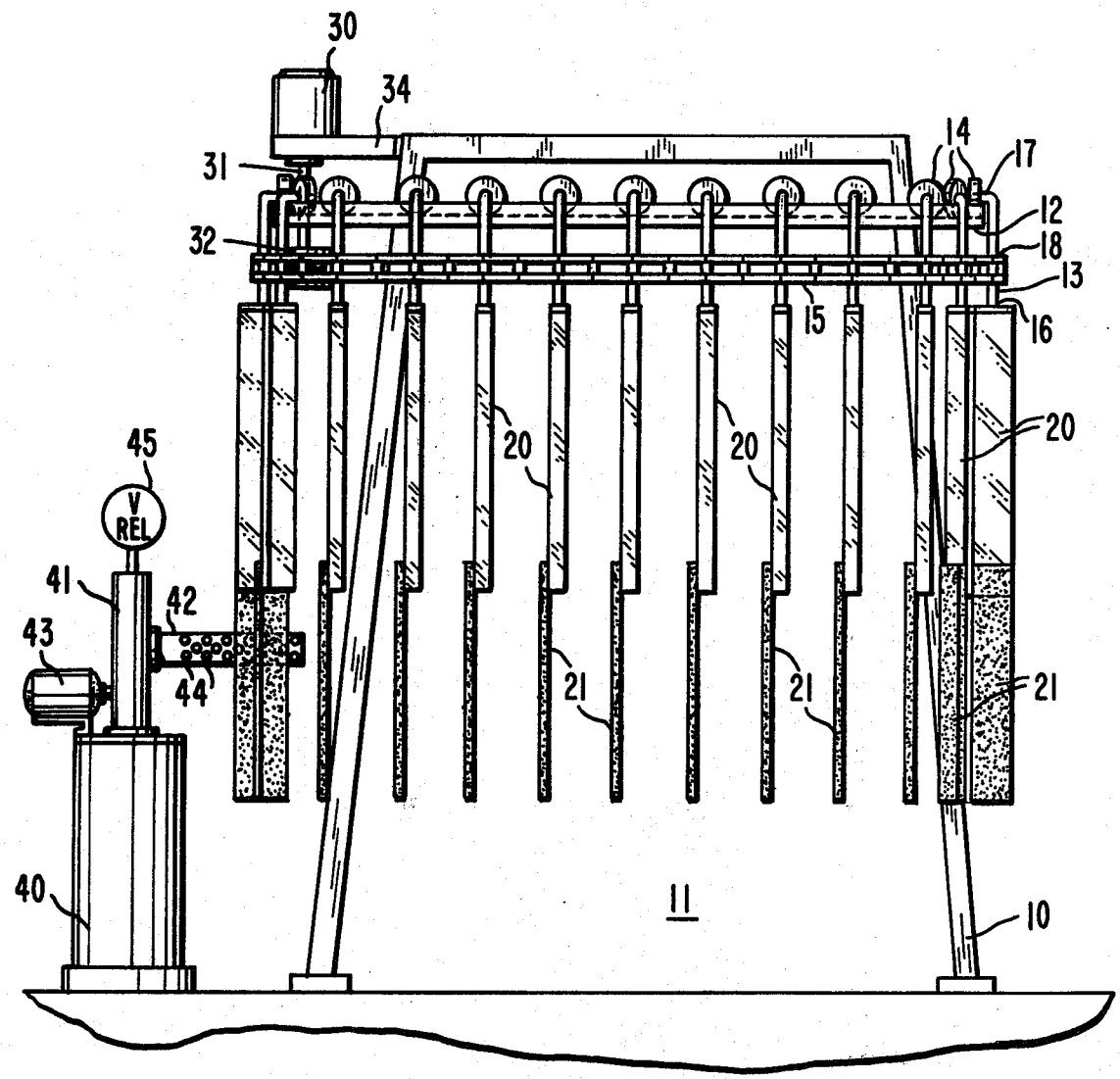
FIG. 1. is a front view of the sub-system for drying the vehicles.

Referring to FIG. 1, mounting frame 10 is shown to be disposed over path 11 through which motor vehicles (not shown) pass after having been washed and rinsed by other subsystems (not shown) of the entire automatic car wash system. In one embodiment of the invention, as will be explained herein, mounted fram 10 supports track 12 which serves the purpose of a guide for the vertically hanging strips 20 and 21 through support members 13 which is shown to be connected to the hanging strip 20 at connection point 16. The support member 13 in rotatably connected to wheel 14 through a conventional bearing mechanism 17, not shown in detail, but commonly known and used in the art. Each hanging strip 20 is connected and supported in the same manner, although only one may be described in this brief description.

Now since the hanging curtains 20 will rotate in path 11, a driving mechanism which may be employed consists of a driving chain 15 connected to each one of the support members 13 of hanging strips 20 by connection means 18 whereby driving motor 30 having shaft 31 and sprokets 32 to intermesh with the chain 15 to provide a driving movement for all ahnging strips 20 when said motor is activated. Motor 30 is shown to be attached ro frame 10 by support element 34. The exact disposition of motor 30 is not critical, as it may be disposed at any location along the driving chain 15. It should be noted, although not conveniently shown by FIG. 1, that the hanging strips rotate in one direction in front side of frame 10 and move in the opposite direction on the other side of frame 10.

An important feature of the invention resides in the fact that hanging strip 20 is transparent to permit an operator of the system to visually observe vehicles from either side of the hanging curtains. Visual observation is sometimes helpful when elements of the car wash system are raised and/or adjusted to accomodate vehicles of different styles, such as hood ornaments or vehicles attachments. Additionally, it may be helpful in avoiding accidents to provide such transparent curtains as ipending emergency situations can be readily observed.

Also shown in FIG. 1 is a vaccum drying system consisting of water tank 40, vaccum chamber 41, suction tube 42, and vaccum drive motor 43. Again, the type of vaccum system shown herein is only for illustrative purposes only. Any type of vaccum system may be employed to create the vaccum and return water back into the water spray system. This type of system may be utilized in conjunction with the spray nozzle and wash and rinse system shown in FIG. 3.

The suction tube 42 of FIG. 1 contains a multitude of inlet parts 44 through which water passes as it is sucked from towels 21 as it passes over the suction tube. The chamber of suction tube 42 is in cirect communication with vaccum chamber 41 such that air is continuously drawn into the suction tube through ports 44. It should be understood that suction tube 42 is disposed in a position such that as the carriage is rotated, hanging towels 21 freely fall against the suction tube.

FIG. 2 shows a top view of the system described in FIG. 1 wherein a more comprehensive understanding of the apparatus may be achieved.

Referring now to FIG. 3, a more detailed disclosure of the preferred embodiment of the vaccum drying mechanism is disclosed wherein, suction tube 42 is shown with vaccum ports 44. Relief valve 45 has been added to relieve any possible pressure buildup in vaccum chamber 41, thus preventing possible damage to vaccum motor 43.

Towel rinse and wash means are also shown in FIG. 3 and consists of a water spray nozzle 50 having ports 51 for spraying water on towels 21 just prior to passing over suction tube 42. A water supply (not shown) is supplied under pressure into tube 50 through opening 52 by conventional means.

FIG. 4 shows the spaced apart relationship of transparent strip 20 and towel 21 having detachable connecting means 22 and 23, commonly known by the tradename "Velcro". Elements 22 and 23 "stick" together when they contact each other by a multitude of minature hooks.

FIGS. 5 and 6 respectively show the front and side view of the vacuum drying mechanism wherein towel guide means 60 have been added to suction tube 42 wherein the towels are more accurately guided over the suction ports 44 of tube 42. The efficiency of the vacuum mechanism may be substantially improved by the addition of such guides as nearly all ports are utilized during of the towels. In the present embodiment, guide means 60 consists of two spaced apart cone-like guides for guiding towels.

Now that a brief description of the invention has been made, what is claim is:

1. A motor vehicle drying appartus for use in on automatic car wash system in which motor vehicles are moved along a defined path through a plurality of vertically hanging towels, said apparatus comprising a main frame assembly having an upper portion traversing the width of the motor vehicle path, rotating carriage means disposed and connected to said upper portion of the main frame for guiding and supporting the vertically hanging towels around said main frame in a defined path, drive means for rotating the carriage around said main frame, a plurality of water absorbing vertically hanging towels connected to said rotating carriage means adapted to be rotated around said main frame in the motor vehicle path, and towel dewatering means comprising a vacuum drying system consisting of a vacuum chamber, means for maintaining a vacuum in said vacuum chamber, and a suction tube having a plurality of ports in communication with said vacuum chamber and being disposed in the path of said vertically hanging towels as said towels are moved by said rotating carriage whereby said towels are dewatered by the suction ports of vacuum drying system.

2. The invention of claim 1 wherein said towels consists of an upper portion comprises a strip of flexible transparent material and the lower portion comprises a water absorbent material so as to provide the opportunity for an operator to visually observe vehicles traveling along said defined path prior to passing said vehicle drying apparatus.

3. The invention of claim 2 wherein the lower portion of the towels comprise chamois-like sheet material.

4. The invention of claim 2 including a detachable connection means comprising "Velcro" elements between the upper and lower strip portions.

5. The invention of claim 2 including water spray nozzle means disposed adjacent to said vacuum drying system to wet the water absorbent towels immediately before passing over said vacuum drying system.

6. The invention of claim 1 wherein the strip dewatering means includes guide means for positioning said vertically hanging towel flat against the cylindrical surface of said suction tube as the towels are driven along said carriage.

7. The invention of claim 6 wherein the strips comprise chamois-like sheet material.

8. The invention of claim 1 wherein the towels comprise chamois-like sheet material.

* * * * *